United States Patent
Prasanna et al.

(10) Patent No.: US 10,198,468 B2
(45) Date of Patent: Feb. 5, 2019

(54) MERGING DATA EDITS WITH INTERVENING EDITS FOR DATA CONCURRENCY

(71) Applicant: Tact.ai Technologies, Inc., Redwood City, CA (US)

(72) Inventors: Dhananjay Prasanna, San Francisco, CA (US); Premnath Parameswaran, Sunnyvale, CA (US)

(73) Assignee: TACT.AI TECHNOLOGIES, INC., Mountain View, CA (US)

( * ) Notice: Subject to any disclaimer, the term of this patent is extended or adjusted under 35 U.S.C. 154(b) by 282 days.

(21) Appl. No.: 15/092,603

(22) Filed: Apr. 6, 2016

(65) Prior Publication Data

US 2016/0299916 A1    Oct. 13, 2016

Related U.S. Application Data

(60) Provisional application No. 62/146,861, filed on Apr. 13, 2015.

(51) Int. Cl.
*G06F 7/00*    (2006.01)
*G06F 17/00*   (2006.01)
*G06F 17/30*   (2006.01)

(52) U.S. Cl.
CPC .. *G06F 17/30371* (2013.01); *G06F 17/30356* (2013.01)

(58) Field of Classification Search
CPC ......... G06F 17/30162; G06F 17/30356; G06F 17/30371
USPC .......................... 707/610, 693, 695, 741, 640
See application file for complete search history.

(56) References Cited

U.S. PATENT DOCUMENTS

2013/0346725 A1* 12/2013 Lomet ..................... G06F 12/10
                                                       711/206
2015/0039573 A1*  2/2015 Bhattacharjee ... G06F 17/30356
                                                       707/693

* cited by examiner

*Primary Examiner* — Md I Uddin
(74) *Attorney, Agent, or Firm* — Fenwick & West LLP

(57) ABSTRACT

A data concurrency module maintains a delta chain for each record that stores the edits made to the flexible record over time. The delta chain stores the edits ordered by a version identifier. When the data concurrency module receives an edit to a record, the data concurrency module compares the version identifier associated with the edit with the most recent version identifier stored in the delta chain for that flexible record. If the version identifiers are different, then the data concurrency module merges the edit with all intervening edits in the delta chain, resolving any conflicts that result from the merging.

15 Claims, 11 Drawing Sheets

| Record ID | Version ID | Source ID | Event Type | Field Name | Field Value | Time | Remote ID | User ID |
|---|---|---|---|---|---|---|---|---|
| 302 | 303 | 304 | 306 | 308 | 310 | 312 | 314 | 315 |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |

| Rec ID | Version ID | First Name | Last Name | DOB | State | Phone |
|---|---|---|---|---|---|---|
| 123 | A-101 | John | Smith | 2/5/1980 | CA | 335-920-8716 |
| 123 | A-102 | John | Smith | 2/5/1980 | CA | +1 335-920-8716 |

*FIG. 8C*

| Record ID | Version ID | Source ID | Event Type | Field Name | Field Value | Time | Remote ID | User ID |
|---|---|---|---|---|---|---|---|---|
| 001 | A-101 | 999 | Insert | First Name | John | 1393... | 123 | 232 |
| 001 | A-101 | 999 | Insert | Last Name | Smith | 1393... | 123 | 232 |
| 001 | A-101 | 999 | Insert | DOB | 2/5/... | 1393... | 123 | 232 |
| 001 | A-101 | 999 | Insert | State | CA | 1393... | 123 | 232 |
| 001 | A-101 | 999 | Insert | Phone | 335-... | 1393... | 123 | 232 |
| 001 | A-102 | 999 | Modify | Phone | +1 33... | 1394... | 123 | 254 |

| Record ID | Version ID | Source ID | Event Type | Field Name | Field Value | Time | Remote ID | User ID |
|---|---|---|---|---|---|---|---|---|
| 001 | A-101 | 999 | Insert | First Name | John | 1393... | 123 | 232 |
| 001 | A-101 | 999 | Insert | Last Name | Smith | 1393... | 123 | 232 |
| 001 | A-101 | 999 | Insert | DOB | 2/5/... | 1393... | 123 | 232 |
| 001 | A-101 | 999 | Insert | State | CA | 1393... | 123 | 232 |
| 001 | A-101 | 999 | Insert | Phone | 335-... | 1393... | 123 | 232 |
| 001 | A-102 | 999 | Modify | Phone | +1 33... | 1394... | 123 | 254 |
| 001 | A-103 | 999 | Modify | Phone | +1 33... | 1394... | 123 | 232 |

MERGING DATA EDITS WITH INTERVENING EDITS FOR DATA CONCURRENCY

CROSS-REFERENCE TO RELATED APPLICATIONS

This application claims the benefit of U.S. Provisional Application No. 62/146,861, filed on Apr. 13, 2015, which is hereby incorporated by reference in its entirety.

BACKGROUND

Field of Art

The disclosure generally relates to the field of data management and specifically to merging data edits with intervening edits for data concurrency.

Description of the Related Art

Data stores typically consist of a system of tables that model application data in a structure of grouped fields known as a schema. Each of these fields has an assigned type and other constraints, such as character, byte-width, and validity specifications. For example, a numeric field may only contain numbers up to a certain predetermined storage limit.

For data aggregation systems that collect data fields from several sources, such a rigid data storage infrastructure has several limitations. First, each source has its own set of fields which are described in a particular schema. Storing data from different sources in a rigid data store schema would thus require maintaining a separate schema for each source. Second, a particular data source may update its schema at any time, and the data store of the data aggregation system would need to be similarly altered, requiring infrastructure changes and expensive data movement operations.

Further, data in the data aggregation system is often stored centrally and delivered to devices that may not, on certain occasions, be available to receive updated data. Consequently, a version of data locally available on a device may be modified, but the underlying data may have already been modified at the data aggregation system. This scenario causes a data concurrency problem between the data aggregation system and the client devices to which the data is delivered. Further, the data modified at the client device may have conflicts with the updated data stored in the data aggregation system.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

Figure (FIG.) 1 illustrates one embodiment of a computing environment configured to coalesce data from several sources and provide the coalesced data to client applications.

FIG. 3 illustrates an embodiment of an operations log stored in the server repository of FIG. 1.

FIGS. 8A-8E illustrate an example of contact information modification using the techniques described in conjunction with FIGS. 1-7.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Processing Overview

Figure 1:
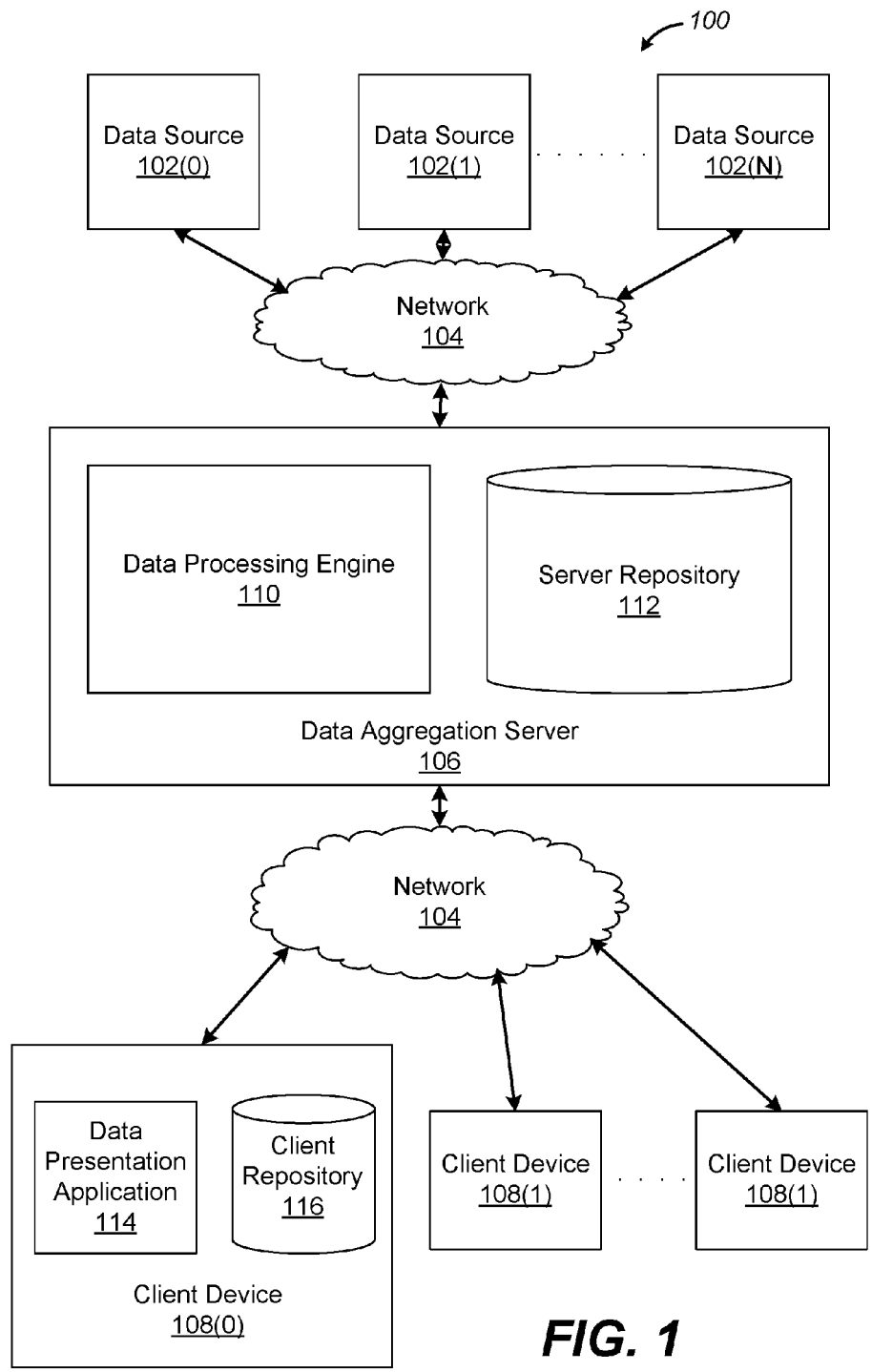

FIG. 1 illustrates one embodiment of a computing environment 100 configured to coalesce data from several sources and provide the coalesced data to client applications. As shown, the computing environment 100 includes data sources 102(0) . . . 102(N) (generally, data sources 102), a data aggregation server 106, and a client device 108. The data sources 102, the data aggregation server 106, and the client device 108 are communicatively coupled to one another through a network 104. Although only one data aggregation server 106 and client device 108 are illustrated, the computing environment 100 may include multiple instances of each entity. Moreover, some of the functions ascribed to the aggregation server 106 may be performed by the client device 108 and vice versa. Other entities may also be coupled to the network 104.

Data sources 102 are part of a system that manages and stores data associated with individuals/entities or groups of individuals/entities. For example, a data source 102 may be a customer relationship management (CRM) system, a document management system, a workflow management system, or a human resource (FIR) management system. Each data source 102 stores data according to a fixed database schema. For example, data source 102(0) may store a user's contact data according to a schema that stores a record per contact, each record being associated with one or more fixed fields. In one embodiment, data storage schemas across different data sources may vary significantly even when storing the same type of data. Each data source 102 provides a channel for accessing and updating data stored within the data source 102.

The data aggregation server 106 includes a data processing engine 110 and a server repository 112. The data processing engine 110 accesses data stored within the data sources 102 via the channels provided by each data source 102. The data processing engine 110 aggregates related data received from the different data sources 102 and organizes the aggregated data into flexible records. A flexible record is a composite of associated fields aggregated from a set of records received from one or more data sources 102. Each field associated with a flexible record includes data received from a particular data source 102 and specifies the particular data source 102 as the source of the data. Flexible records are stored in the server repository 112, and each flexible record is associated with at least one user who accesses data via a client device, such as client device 108, communicating with the data aggregation server 106.

In operation, when a user creates an account with the data aggregation server 106, the user identifies one or more data sources 102 that store data associated with the user. In one embodiment, the data aggregation server 106 automatically, without user intervention, identifies the data sources 102 that store data associated with the user based on the user's location, name, organization affiliation, etc. The data processing engine 110 retrieves from each identified data source, one or more records storing data associated with the user.

The records retrieved from different data sources 102 may store related data but may be structured according to different schemas. The data processing engine 110 aggregates the records and stores the aggregated records as flexible records in the server repository 112. In one embodiment, multiple users may be associated with the same data in one or more data sources 102. In such an embodiment, the data processing engine 110 does not generate multiple flexible records storing the same data, but associates the multiple users with the same flexible record storing the data.

Data stored in the server repository 112 that is associated with a particular user is transmitted to the client device 108 operated by the user for presentation in the data presentation application 114. Data received from the server repository 112 is stored in the client repository 116. The data presentation application 114 retrieves data stored in the client repository 116 and allows users to view and interact with the data as well as modify the data if necessary. Any modifications made to the data are stored in the client repository 116 and also transmitted by the data presentation applications 114 to the data processing engine 110.

The data processing engine 110 tracks all edits made to data that is stored in the server repository 112. In one embodiment, the data processing engine 110 maintains a delta chain for each flexible record that stores the differences between the edits made to the flexible record over time. This enables the data processing engine 110 to perform version tracking and merging operations based on modifications to the flexible record. The details of these operations are provided below.

In one embodiment, the data processing engine 110 identifies a particular data field stored in the server repository 112 that was modified via the data presentation application 114. The data processing engine 110 transmits the modified data to the data source 102 specified in the data field. In such a manner, a data field that is modified on the client device 108 may be synchronized with the data field stored in the server repository 112 as well as the data source 102 from which the data associated with the data field was originally retrieved.

The network 104 represents the communication pathways between the data aggregation server 106, client device 108, and any other entities on the network. In one embodiment, the network 104 is the Internet and uses standard communications technologies and/or protocols. Thus, the network 104 can include links using wired and/or wireless technologies such as Ethernet, 802.11, worldwide interoperability for microwave access (WiMAX), 3G, 4G, 5G, long term evolution (LTE), digital subscriber line (DSL), asynchronous transfer mode (ATM), InfiniBand, PCI Express Advanced Switching, etc. Similarly, the networking protocols used on the network 104 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 104 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

Figure 2:
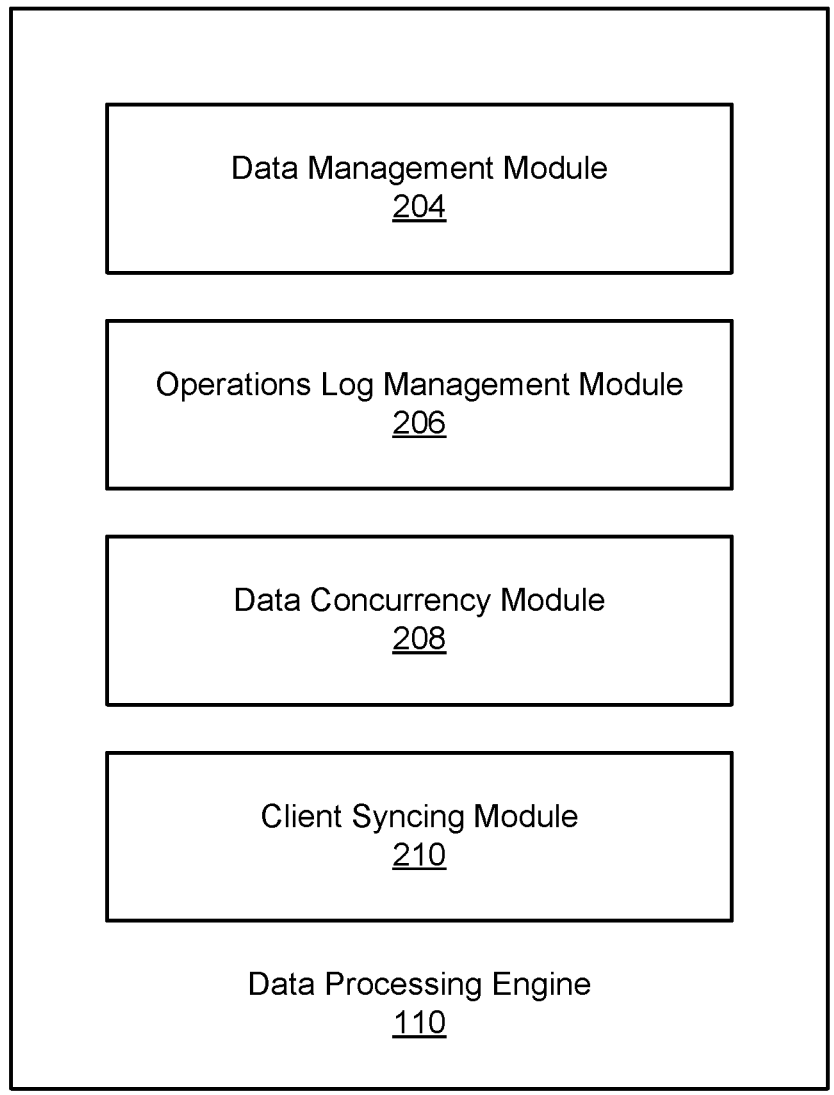
FIG. 2 illustrates an embodiment of the data processing engine of FIG. 1.

FIG. 2 illustrates an embodiment of the data processing engine 110 of FIG. 1. As shown, the data processing engine 110 includes a data management module 204, an operations log management module 206, a data concurrency module 208, and a client syncing module 210.

The data management module 204 receives data associated with a particular user from various data sources 102. The data management module 204 processes the data by performing various operations before the data is stored in the server repository 112. Data de-duplication is one operation performed on the data by the data management module 204 to remove duplicate data received from different data sources 102. For example, if two data sources 102 include contacts associated with the user, the contact data received from the two data sources 102 may include several duplicate contacts. In such a situation, the data management module 204 performs a de-duplication operation on the contact data to remove duplicate contacts.

The data management module 204 analyzes the processed data and aggregates data fields related to the same object. An object includes any data structure having multiple attributes, where the value of each attribute is specified in a different data field. Examples of objects include contacts, documents, calendar items, workflows, etc. For each object, the data management module 204 transmits all the data fields related to the object to the operations log management module 206 for storing in the server repository 112 as a flexible record.

When data fields are stored as a flexible record in the server repository 112, each data field is stored separately and all the data fields of the flexible record are associated with the same record identifier. For example, for a first name field of a contact flexible record, storing the first name field separately may take the form of: record_id: 123, name: "first_name", value: "Chuck." Each of the remaining data fields of the contact flexible record, such as last name, phone number, and email, are stored similarly. The record identifier, i.e., record_id: 123, remains the same across all data fields of the contact flexible record. In such a manner, related data fields that are retrieved from data sources 102 having disparate schemas are stored in the server repository 112 in a flexible and easily scalable structure. Specifically, any number of related data fields may be modeled by associating the related data fields with the same record identifier.

The operations log management module 206 maintains an operations log in the server repository 112 for storing flexible records that include data fields retrieved from the data sources 102, updated by the data presentation application 114, and/or generated by the data presentation application 114. An operations log includes multiple rows, where each row is associated with a unique combination of a user identifier, a data field, a version identifier, and a timestamp reflective of an event related to the data field. Examples of events related to the data field include insertion of a data field, editing of a data field, or deleting data field. Each row includes the value of the data field after the event. Further, each row includes the source of the data field, such as the particular data source 102 from which the data field was first retrieved, and the remote identifier of the data field in the source system.

FIG. 3 illustrates an embodiment of an operations log 300 stored in the server repository 112 of FIG. 1. As shown, the operations log 300 is organized as a table having multiple columns and rows. Specifically, the operations log 300 includes the record identifier column 302, the version identifier column 303, the source identifier column 304, the event type column 306, the field name column 308, the field value column 310, the time column 312, the remote identifier column 314, and the user identifier column 315.

Each row in the operations log 300, such as row 316, represents a particular event related to a data field of a flexible record. Specifically, each row is associated with a unique combination of the values for the user identifier column 315, version identifier column 303, the field name column 308, and the time column 314. The value of the event type column 306 indicates the particular event that occurred at the time stamp indicated by the time column 312. The value of the field value column 310 indicates the value of the data field after the particular event occurred. The value of the version identifier column 303 indicates the version of the data field associated with the event. Rows representing events related to data fields of the same flexible record share the same record identifier in the record identifier column 302. By evaluating the most recently inserted row in the operations log 300 for each data field of a given flexible record, the data management module 204 is able to determine the current state of the data field.

When the data presentation application 114 is first installed on the client device 108, the operations log management module 206 receives a request from the data presentation application 114 for data associated with a particular user. The operations log management module 206 identifies all the rows in the operations log in the server repository 112 that are associated with the particular user. The operations log management module 206 then generates a client operations log that stores the identified rows and transmits the client operations log to the client device 108 for storage in the server repository 112. The data presentation application 114 interacts with the client operations log to access, modify or insert data fields. Each operation performed by the data presentation application 114 on a data field is captured in a new row of the client operations log indicating the operation that was performed and the value of the data field after the operation.

In one embodiment, any modifications made to the client operations log are transmitted back to the operations log management module 206. In synchronizing modifications received from the client operations logs with the server operations log, the operations log management module 206 operates in conjunction with the data concurrency module 208 to manage versioning of the data field modifications and perform one or more conflict resolution operations if necessary. In particular, when the operations log management module 206 receives an edit to the data field, the operations log management module 206 transmits the edit to the data concurrency module 208 to (1) determine a new version identifier for the edit and (2) perform any conflict resolution operations if necessary.

The data concurrency module 208 maintains a delta chain for each flexible record in the operations log that stores the edits made to the flexible record over time. The delta chain stores the edits ordered by version identifier. For example, assume that a flexible record includes a telephone number data field that had a value of 650-988-9888 at version 101 and a value of 650-988-8889 at version 102. The delta chain then stores both 650-988-9888 and 650-988-8889 in that order for the telephone number data field. When the data concurrency module 208 receives an edit to a flexible record from the operations log management module 206, the data concurrency module 208 compares the version identifier associated with the edit with the most recent version identifier stored in the delta chain for that flexible record.

If the version identifier associated with the edit matches the most recent version identifier, then the edit was made to the most recent version of the flexible record and no conflict resolution operations need to be performed. In this case, the data concurrency module 208 generates a new version identifier (the most recent version identifier associated with the flexible record), stores the value and the new version identifier in the delta chain, and transmits the new version identifier to the operations log management module 206. The operations log management module 206 stores a new row in the operations log for the modification to the data field that identifies the new version identifier and the new value.

In some cases, a data presentation application 114 edits an earlier version of the flexible record relative to the most recent version stored in the operations log stored in the server repository 112. In this case, the version identifier associated with the edit does not match the most recent version identifier, as the edit was not made to the most recent version of the flexible record. The data concurrency module 208 performs conflict resolution and merge operations based on all intervening edits made to the flexible record, as identified by the delta chain, to generate a resolved value for the edit. The details of these operations are discussed below in conjunction with FIG. 4.

Once the resolved value is generated, the data concurrency module 208 generates a new version identifier (the most recent version identifier associated with the data field), stores the value and the new version identifier in the delta chain, and transmits the new version identifier and the resolved value to the operations log management module 206. The operations log management module 206 stores a new row in the operations log for the modification to the data field of the flexible record, where the new row identifies the new version identifier and the resolved value.

The operations log management module 206, upon modifying the operations log in the server repository 112, may also propagate the updates to the data sources 102 from which the data fields were originally received. In operation, for each modified data field, the operations log management module 206 determines the source of the data field and the remote identifier of the data field in the source. The operations log management module 206 transmits the modified data of the data field in conjunction with the remote identifier to the source. The source may optionally update its internal data stores to reflect the modifications made to the data field.

The client syncing module 210 periodically transmits any updates made to data fields in the operations log stored in the server repository 112 to the client operations log. For example, when a data field in a data source 102 changes, the changed value of the data field is transmitted to the operations log management module 206. The operations log management module 206 inserts a new row in the operations log stored in the server repository 112 indicating the changed value of the data field. The client syncing module 210 transmits the changed value to the client repository 116 for storage in the client operations log.

Figure 4:
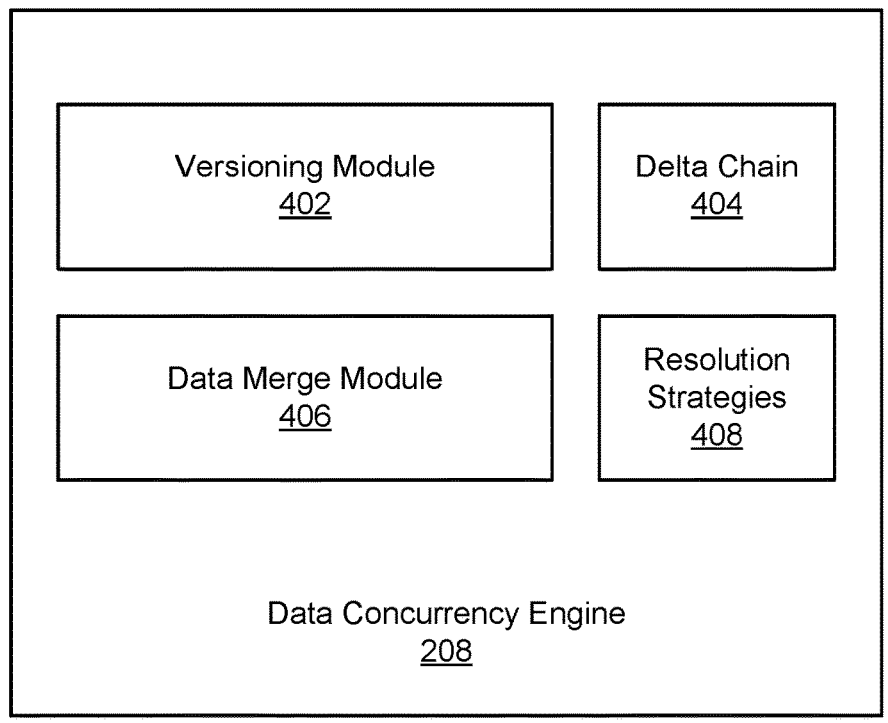
FIG. 4 illustrates an embodiment of the data concurrency module of FIG. 2.

FIG. 4 illustrates an embodiment of the data concurrency module 208 of FIG. 2. The data concurrency module 208 includes a versioning module 402, a delta chain 404, a data merge module 406, and one or more resolution strategies 408.

The versioning module 402 maintains a delta chain 404 for each flexible record maintained by the operations log in the server repository 112. Specifically, the versioning module 402 generates the version identifier corresponding to each change to the flexible record and also stores an ordered history of changes to the flexible record in conjunction with the version identifiers in the delta chain 404. In operation, the versioning module 402 receives a request to version an edit to a data field of a flexible record from the operations log management module 206. The versioning module 402 compares the version identifier associated with the edit with the most recent version identifier stored in the delta chain 404 for that flexible record.

If the version identifier associated with the edit matches the most recent version identifier, then the edit was made to the most recent version of the flexible record and no merging or conflict resolution operations need to be performed. In this case, the versioning module 402 generates a new version identifier (the most recent version identifier associated with the flexible record), stores the value and the new version identifier in the delta chain, and transmits the new version identifier to the operations log management module 206. As discussed above, the operations log management module 206 in turn stores a new row in the operations log for the modification to the data field that identifies the new version identifier and the new value.

If the version identifier associated with the edit does not match the most recent version identifier, then the edit was not made to the most recent version of the flexible record associated with the data field. The versioning module 402 transmits a request to the data merge module 408 for generating a resolved value based on the edit and the version history stored in the delta chain 404, as discussed below. Once the resolved value of the data field is generated, the versioning module 402 generates a new version identifier (the most recent version identifier associated with the data field), stores the value and the new version identifier in the delta chain, and transmits the new version identifier and the resolved value to the operations log management module 206.

The data merge module 406 transforms an edit that is made to an earlier version of a flexible record according to more recent versions of the flexible record identified by the delta chain 404 to generate the resolved value. The data merge module 406 transforms the edit by, first, identifying all intervening edits between the edited version (the "non-current version") and the most recent version (the "current version"). The data merge module 406 then repeatedly merges the edit with the intervening edits, as further described herein.

In the first step, the data merge module 406 accesses the delta chain 404 to identify a set of ordered intervening edits made to the flexible record. The set of intervening edits include all the edits made to the flexible record since the non-current version. The set of intervening edits is ordered according to the relative version identifiers. In the second step, for each intervening edit in the set, the data merge module 406 merges the received edit to the flexible record with the edit in the set. Specifically, for the earliest intervening edit, the data merge module 406 merges the earliest intervening edit with the received edit to the flexible record to generate a transformed edit. The data merge module 406 then merges the transformed edit with the next intervening edit and so forth until all the intervening edits are merged.

To merge two edits, the data merge module 406 identifies each of the data fields of the flexible record that are different between the two edits (referred to herein as the "delta data fields"). For each of the delta data fields, the data merge module 406 identifies a resolution strategy from the resolution strategies 408 that is associated with the type of the delta data field. A resolution strategy for a given type specifies one or more mechanisms for merging two edits to preserve the intent of the two edits and resolve resulting conflicts. In one embodiment, the type of a delta data field is tied to the value of the data field. For example, a different resolution strategy may be selected for a data field that stores numbers relative to a data field that stores names. Similarly, a different resolution strategy may be selected for a data field that stores the status of a task relative to a data field that stores remarks related to a task.

The data merge module 406 is an extensible merge platform where custom resolution strategies may be added to the resolution strategies 408 depending on the types of merges that need to be performed. Some examples of resolution strategies are provided below. Persons skilled in the art would readily recognize that other types of resolution strategies are also applicable here.

In a first example, a resolution strategy related to a status change on a task management system is described. Specifically, a business may have a business rule or a requirement that notes are logged into a 'work log' data field of a ticket flexible record while a ticket is in progress, but after the ticket is closed, any notes must be added to a 'remarks' data field of the ticket flexible record. In this case, a conflict occurs when a first user edits a task flexible record to add a question to the work log data field while the task is in progress. The first user is essentially editing a version of the task flexible record that indicates that the task is in progress. A second user independently closes the task, thus changing the status data field to 'done.' While these changes are made to different data fields, the data merge module 406 merges the changes according to the resolution strategies related to the changed data fields.

In this particular case, the resolution strategy indicates the business rule that notes are logged into a "work log" data field of a ticket flexible record only while a ticket is in progress. Since the second user closed the ticket, the first user's edit of the work log data field violates the business rule. The data merge module 406 executes the resolution strategy that modifies the edit received from the first user make the edit to the remarks data field instead of the work log data field of the flexible record.

In a second example, a resolution strategy related to a name data field of a shared company address book contact is described. In this example, assume a name data field of a flexible record indicates "Inigo Montoya." A first user appends the prefix "Ms." to the name resulting in an edit to the name data field of "Ms. Inigo Montoya." Independently, a second user edits the same version of the flexible record and appends a suffix resulting in an edit to the name data field of "Inigo Montoya, PhD." The data merge module 406 executes the resolution strategy for the name data field that indicates that prefixes and suffixes can be combined across different edits. Therefore, the data merge module 406 transforms the edit received from the second user to generate a resolved value of "Ms. Inigo Montoya, PhD." for the name data field of the flexible record.

In a third example, a resolution strategy related to email communication in a task management system is described. Specifically, a business may have a business rule or a requirement that anytime a task is assigned to a particular organization, such as information technology support, any subsequent emails related to the task are transmitted to all the managers in that organization. The task flexible record includes an email carbon copy ("cc") data field that stores a list of email addresses to which any emails related to the task are sent. Assume that the email cc data field of a given task flexible record that is not assigned to the particular organization includes the list: joe@abc.com, jim@abc.com, and jeff@abc.com. A user then assigns the task to the particular organization, and, as a result, all the managers in that organization are appended to the email cc data field. If joe@abc.com is also a manager in that organization, then the email address is added to the email cc data field twice. Every email would thus be sent to joe@abc.com twice. The data merge module 406 executes the resolution strategy for the email cc field should not have duplicate email addresses. Therefore, the data merge module 406 transforms the edit received from the user to generate a resolved value of "joe@abc.com, jim@abc.com, and jeff@abc.com" for the email cc data field of the flexible record.

Figure 5:
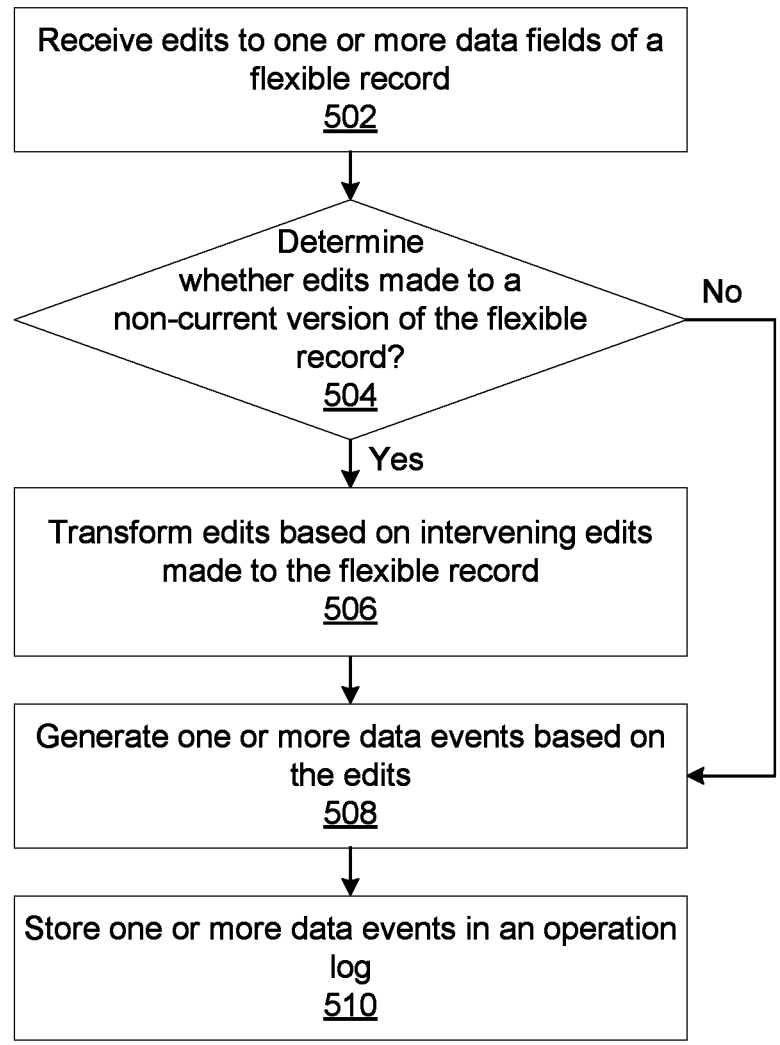
FIG. 5 illustrates an embodiment of a process for modifying a flexible record stored in the operations log.

FIG. 5 illustrates an embodiment of a process for modifying a flexible record stored in the operations log. The data concurrency module 208 receives 502 edits to one or more data fields of a flexible record. The data concurrency module 208 determines 504 whether the received edits were made to a non-current version of the flexible record. In one embodiment, the data concurrency module 208 makes such a determination by identifying a version identifier associated with the edited flexible record and the most recent version identifier associated with the flexible record.

If the data concurrency module 208 determines that the received edits were made to a non-current version of the flexible record, then the data concurrency module transforms 506 the edits based on all intervening edits made to the flexible record between the edited version and the most recent version. The process for transforming the edits is described in greater detail below in conjunction with FIG. 6.

If the data concurrency module 208 determines that the received edits were made to a current version of the flexible record, then the process proceeds directly to 508. The operations log management module 206 generates 508 one or more data events based on the edits (whether transformed or original). In one embodiment, the data concurrency module 208 provides the operations log management module 206 a new version identifier associated with the flexible records and the data events generated based on the edits. The new version identifier is included in the data events generated by the operations log management module 206. The data concurrency module 208 stores 510 the one or more data events in an operation log.

Figure 6:
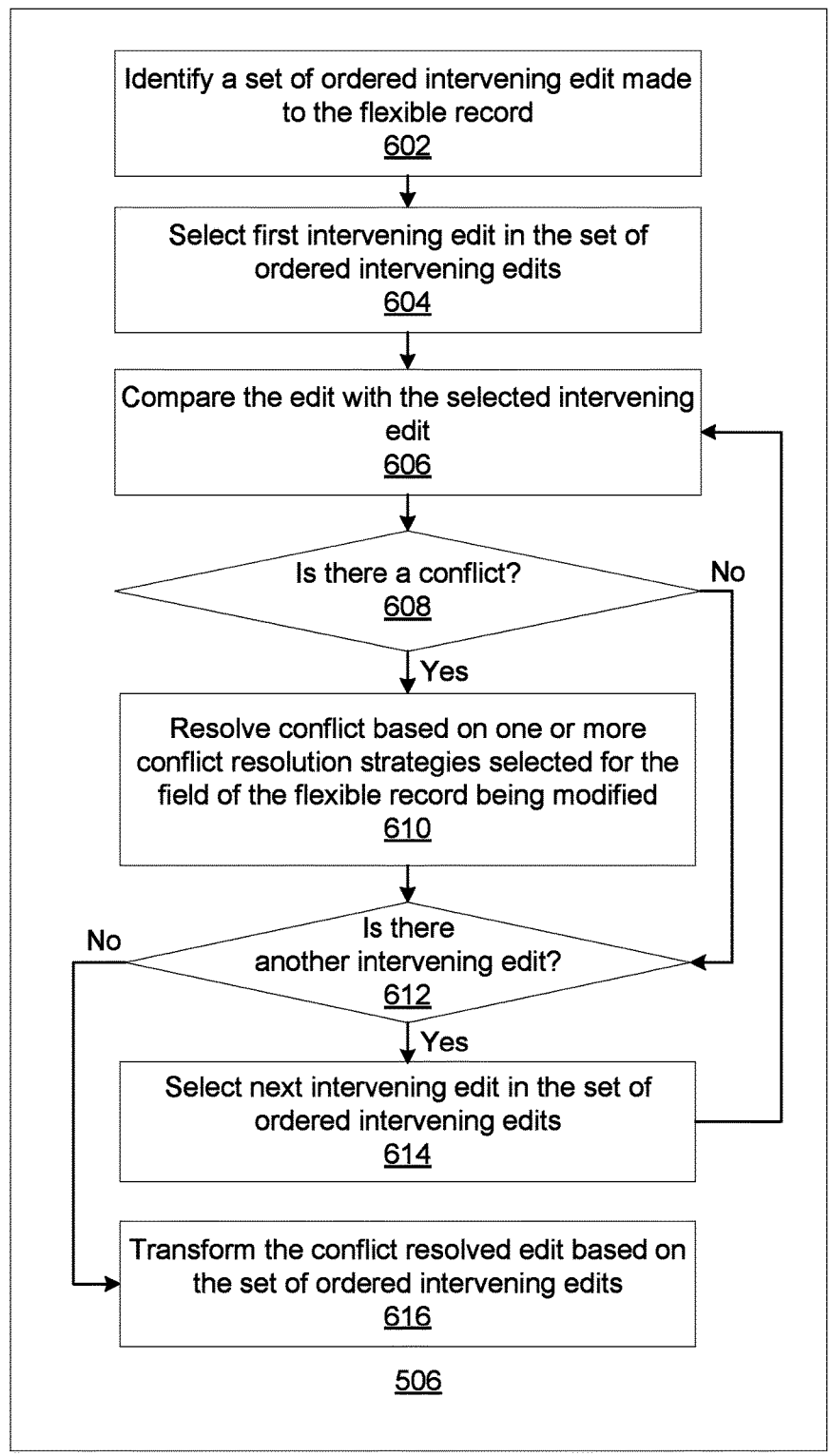
FIG. 6 illustrates an embodiment of a process for transforming a modification to a non-current version of a flexible record based on intervening modifications made to the flexible record.

FIG. 6 illustrates an embodiment of a process for transforming edits to a non-current version of a flexible record based on intervening modifications made to the flexible record. The data concurrency module 208 identifies 602, based on a delta chain associated with the flexible record set, a set of ordered intervening edits made to the flexible record between the edited non-current version and the most recent version. The data concurrency module 208 selects 604 a first intervening edit in the set of ordered intervening edits. The data concurrency module 208 selects an intervening edit from the set in order, such that the intervening edit from the oldest version after the edited version is selected before the intervening edit from the most recent version.

The data concurrency module 208 compares 606 the edits to the non-current version with the intervening edit. The data concurrency module 208 determines 608 whether there is a conflict between the edit to the non-current version and the intervening edit. In one embodiment, a conflict occurs when the same data field of the flexible record is edited across the two edits. In another embodiment, a conflict occurs when the combination of edits violate a business rule specified by the data aggregation system.

If a conflict is determined, then the data concurrency module 208 resolves 610 the conflict, without user intervention, based on one or more resolution strategies selected for the data fields of the flexible record that were edited. Resolving 610 the conflict generates a resolved value for the edit. If a conflict is not determined, then the data concurrency module 208 proceeds directly to 612.

The data concurrency module 208 determines 612 whether there is another intervening edit in the set of ordered intervening edits. If so, then the data concurrency module 208 selects 614 the next intervening edit in the set of ordered intervening edits and returns to 606. If there are no other intervening edits, then the data concurrency module 208 transforms 616 the edit (resolved value or original value depending on whether there were any conflicts) based on the set of intervening edits. The transformation essentially merges the edit with the intervening edits.

Figure 7:
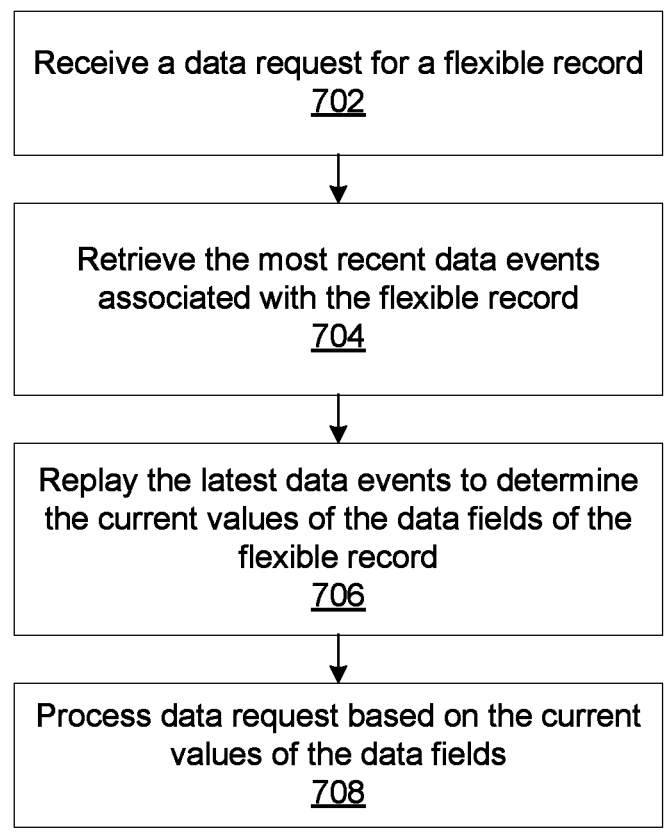
FIG. 7 illustrates an embodiment of a process for processing data requests from a client device using an operations log.

FIG. 7 illustrates an embodiment of a process for processing data requests from a client device using an operations log. The data management module 204 receives 702 a data request for a flexible record. The data management module 204 retrieves 704 the most recent event associated with each of the data fields of the flexible record from the operation log of the server repository 112. The data management module 204 replays 706 the retrieved events to determine the current values of the data fields of the flexible record. The data management module 204 processes 708 the data request based on the current values of the data fields of the flexible record.

In one embodiment, the data presentation application 114 processes data requests using the client operations log in the same manner as discussed above in conjunction with steps 402-414.

Example: Contact Information Aggregation

The techniques described above may be used to aggregate contact information dispersed across multiple contact data sources. Each contact data source may store individual contact information according to a different schema.

Figure 8A:
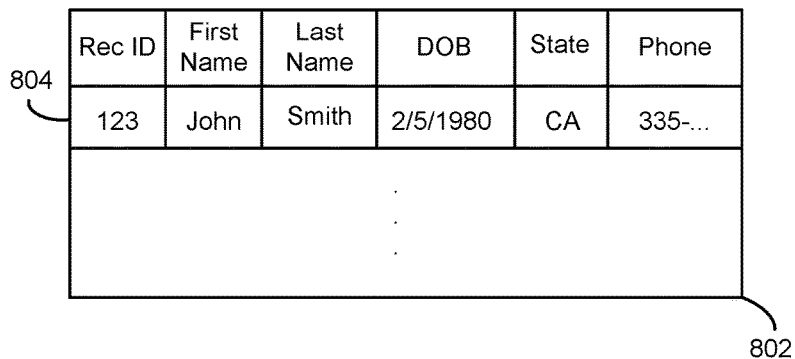

FIGS. 8A-8E illustrate an example of contact information modification using the techniques described in conjunction with FIGS. 1-7. Specifically, FIG. 8A illustrates a database table 802 in a contact data source. The table 802 has a specific schema, where each record in the table, such as record 804, stores information about a particular contact. The information includes a first name, a last name, a date of birth, a state and a phone number. A different contact data source may store contact information in a different structure, or may have a subset or a superset of the information stored in the table 802.

The data management module 204 retrieves contact information stored in the table 802 from the contact data source. The data management module 204 processes the contact information to generate a flexible record. As discussed above, a flexible record stores data fields of a given record separately and all the data fields of the flexible record are associated with the same record identifier. For contact record 804 in FIG. 8A, the data management module 204 creates a different insert event for each field of the generated flexible record and transmits the insert events to the operations log management module 206 for storing in the operations log 806.

Figure 8B:
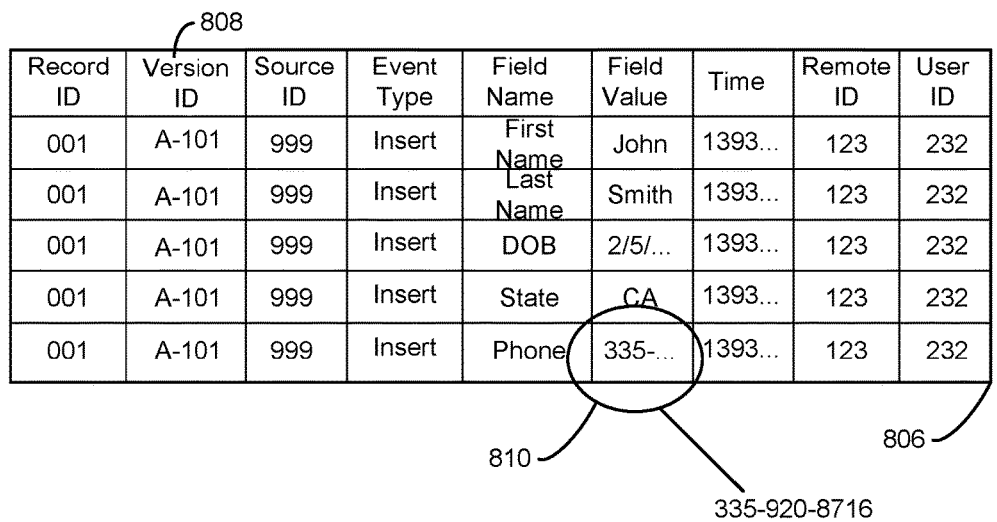

FIG. 8B illustrates the insert events associated with the insertion of contact record 802 in the operations log 806. As shown, the data fields for the flexible record are all associated with the same version identifier 808, i.e., "A-101." Further, the phone data field has the value 810 of "335-920-8716."

FIG. 8C illustrates a delta chain 812 associated with the flexible record "001" shown in FIG. 8B. The delta chain 812 includes a different row for each of the two versions of the flexible record, "A-101" and "A-102." The difference between the two versions is the modification to the phone number field.

FIG. 8D illustrates the operations log 806 after the modification to the phone number field. The modification resulted in a new row 814 being added to the operations log that includes the phone number value 816. The value 816 stores "+1 335-920-8716."

The rest of this exemplary discussion assumes that a first user has access to a client operations log that stores version "A-101" of the flexible record, and that the client operations log has not been updated with the most recent version "A-102." The first user edits the version "A-101" to modify the phone number value to be "335-000-4212."

When the data concurrency module 208 receives the first user's edits, the data concurrency module 208 compares the edits against the intervening edit in version A-102. Based on this comparison, the data concurrency module 208 determines that a conflict exists between the edit and the intervening edit as the phone number field was modified in both edits. The data concurrency module 208 identifies a resolution strategy that resolves the conflict, namely a strategy that preserves the intent of both modifications. In this case, the edit in A-102 adds a country code to the phone number field and the edit made by the first user modifies the phone number digits. The data concurrency module 208 determines that the resolved value should include the country code as well as the modified phone number digits. Consequently, the operations log 806 includes a new data event 818 for the flexible record 001 that includes the resolved value as the data field, namely "+1 335-000-4212." The data event is associated with a new version of the flexible record, namely "A-103."

Example Computing Machine Architecture

Figure 9:
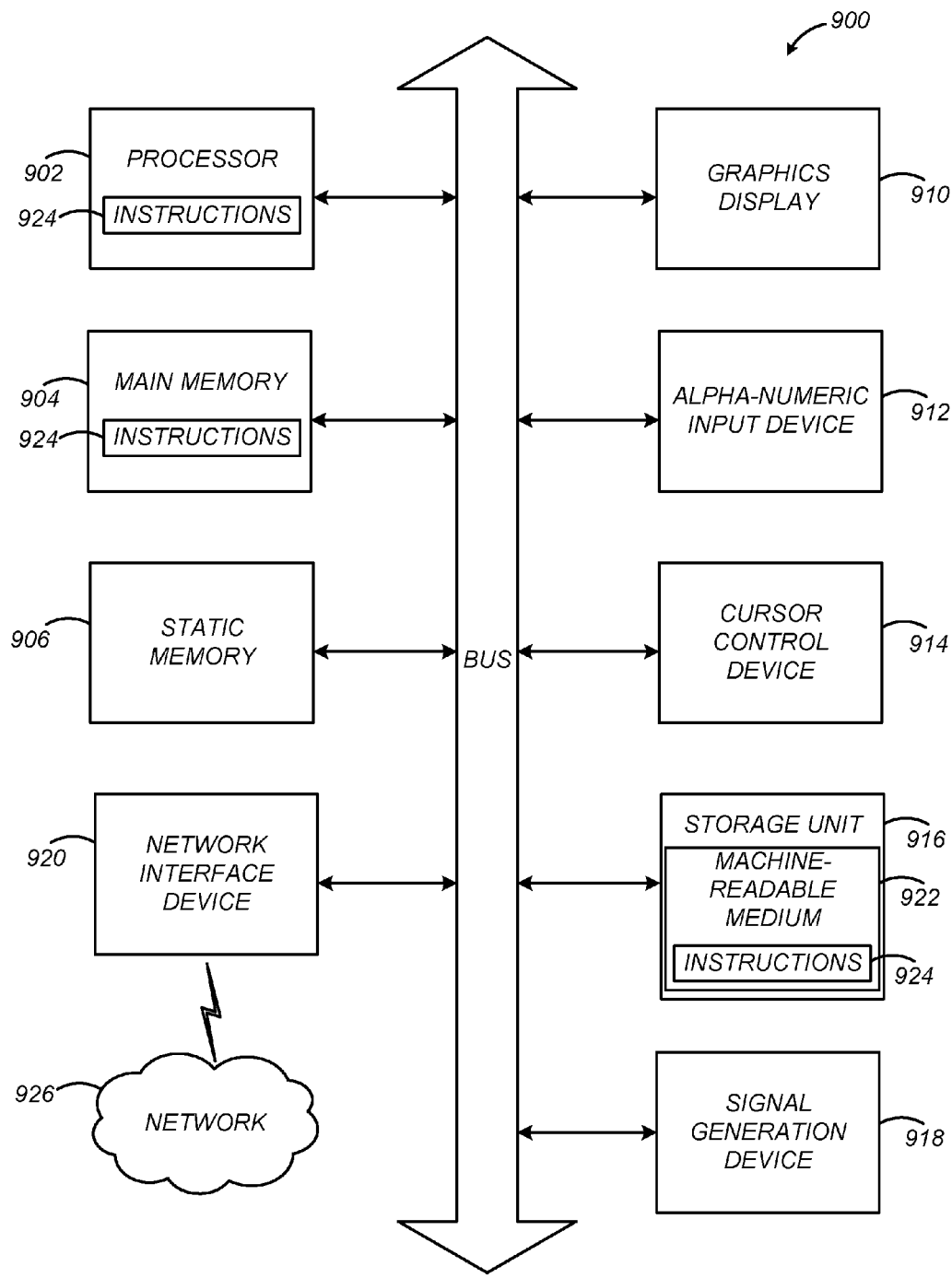
FIG. 9 illustrates one embodiment of components of an example machine able to read instructions from a machine-readable medium and execute them in a processor (or controller).

The disclosed system, software structures and processes described with FIGS. 1-5 are configured for operation on a machine, e.g., a computing system. FIG. 9 is a block diagram illustrating components of an example machine able to read instructions from a machine-readable medium and execute them in one or more processors (or controller) (generally, processor). Specifically, FIG. 9 shows a diagrammatic representation of a machine in the example form of a computer system 900 within which instructions 924 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine for this configuration may be a mobile computing devices such as a tablet computer, an ultrabook (or netbook) computer, a personal digital assistant (PDA), a cellular telephone, a smartphone, a web appliance, or like machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processors 902 (e.g., a central processing unit (CPU) and may also include a graphics processing unit (GPU), a digital signal processor (DSP), one or more application specific integrated circuits (ASICs), one or more radio-frequency integrated circuits (or chipset) (RFICs), a wireless fidelity (WiFi) chipset, a global positioning system (GPS) chipset, an accelerometer (one, two, or three-dimensional), or any combination of these). The computer system 900 also includes a main memory 904 and a static memory 906. The components of the computing system are configured to communicate with each other via a bus 908. The computer system 900 may further include graphics display unit 910 (e.g., a plasma display panel (PDP), a liquid crystal display (LCD)) which may be configured for capacitive or inductive touch sensitivity to allow for direct interaction with software user interfaces through the display 910. The computer system 900 may also include alphanumeric input device 912 (e.g., a keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

An advantage of the configurations as disclosed is that edits to different versions of records can be merged automatically without manual intervention. Consequently, data concurrency can be maintained across a server and multiple clients. Further, the configurations as disclosed allow for an extendible merge platform, where, depending on the business rules and data management requirements, different resolution strategies can be plugged into the merge module.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., processor 902) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 902, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for persisting data received from different data sources through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method for persisting data received from different data sources, the method comprising:
    maintaining a delta chain for a record, the delta chain identifying a current version of the record with a first version identifier and an earlier version of the record with a second version identifier, wherein a data field of the current version has a first value and the same data field of the earlier version has a second value different than the first value;
    receiving an edit made to the earlier version of the record associated with the second version identifier, the edit comprising a change of the second value to a third value different than the first value;
    determining that a conflict exists between the third value associated with the received edit and the first value associated with the current version by comparing a version identifier associated with the received edit with a version identifier of the current version stored in the delta chain for the record;
    selecting a resolution strategy based on a data type associated with the data field, wherein the resolution strategy for the data type specifies one or more mechanisms for merging two edits to resolve conflicts;
    merging, based on the selected resolution strategy, the third value associated with the received edit and the first value associated with the current version to generate a resolved edit that incorporates at least a portion of the first value and a portion of the third value, wherein the merging comprises:
        merging the received edit and a second edit to the earlier version of the record to generate an intermediary resolved edit,
        merging the intermediary resolved edit the resolved edit to generate a final resolved edit;
    storing the final resolved edit in an operation log in association with a new version of the record to maintain data concurrency of the delta chain for the record; and
    modifying the delta chain to identify the new version of the record to as the most recent version of the record.

2. The method of claim 1, wherein selecting the resolution strategy comprises determining a data type of the data field associated with the current version of the record, and selecting the resolution strategy based on the data type of the data field.

3. The method of claim 1, wherein selecting the resolution strategy comprises selecting the resolution strategy based on a difference between the first value and the second value.

4. The method of claim 1, wherein the current version of the record indicates that a status of a task is set to complete and the edit indicates that the task is in progress, and the selected resolution strategy indicates that the resolved edit is to be made to a second data field.

5. The method of claim 1, wherein the selected resolution strategy indicates that the resolved edit should append text to the first value based on the third value.

6. The method of claim 1, wherein selecting the resolution strategy comprises selecting from a plurality of resolution strategies provided for the different data sources.

7. The method of claim 1, wherein the delta chain is a temporally ordered list of versions of the record.

8. A non-transitory computer readable medium for storing instructions that, when executed by a processor, cause the processor to perform the steps of:
    maintaining a delta chain for a record, the delta chain identifying a current version of the record with a first version identifier and an earlier version of the record with a second version identifier, wherein a data field of the current version has a first value and the same data field of the earlier version has a second value different than the first value;
    receiving an edit made to the earlier version of the record associated with the second version identifier, the edit comprising a change of the second value to a third value different than the first value;
    determining that a conflict exists between the third value associated with the received edit and the first value associated with the current version by comparing a version identifier associated with the received edit with a version identifier of the current version stored in the delta chain for the record;
    selecting a resolution strategy based on a data type associated with the data field, wherein the resolution strategy for the data type specifies one or more mechanisms for merging two edits to resolve conflicts;
    merging, based on the selected resolution strategy, the third value associated with the received edit and the first value associated with the current version to generate a resolved edit that incorporates at least a portion of the first value and a portion of the third value, wherein the merging comprises:
        merging the received edit and a second edit to the earlier version of the record to generate an intermediary resolved edit,
        merging the intermediary resolved edit the resolved edit to generate a final resolved edit;
    storing the final resolved edit in an operation log in association with a new version of the record to maintain data concurrency of the delta chain for the record; and
    modifying the delta chain to identify the new version of the record to as the most recent version of the record.

9. The computer readable medium of claim 8, wherein selecting the resolution strategy comprises determining a data type of the data field associated with the current version of the record, and selecting the resolution strategy based on the data type of the data field.

10. The computer readable medium of claim 8, wherein selecting the resolution strategy comprises selecting the resolution strategy based on a difference between the first value and the second value.

11. The computer readable medium of claim 8, wherein the current version of the record indicates that a status of a task is set to complete and the edit indicates that the task is in progress, and the selected resolution strategy indicates that the resolved edit is to be made to a second data field.

12. The computer readable medium of claim 8, wherein the selected resolution strategy indicates that the resolved edit should append text to the first value based on the third value.

13. The computer readable medium of claim 8, wherein selecting the resolution strategy comprises selecting from a plurality of resolution strategies provided for the different data sources.

14. The computer readable medium of claim 8, wherein the delta chain is a temporally ordered list of versions of the record.

15. A system for persisting data received from different data sources, the system comprising:
 a memory storing instructions; and
 a processor for executing the instructions to perform the steps of:
  maintaining a delta chain for a record, the delta chain identifying a current version of the record with a first version identifier and an earlier version of the record with a second version identifier, wherein a data field of the current version has a first value and the same data field of the earlier version has a second value different than the first value;
  receiving an edit made to the earlier version of the record associated with the second version identifier, the edit comprising a change of the second value to a third value different than the first value;
  determining that a conflict exists between the third value associated with the received edit and the first value associated with the current version by comparing a version identifier associated with the received edit with a version identifier of the current version stored in the delta chain for the record;
  selecting a resolution strategy based on a data type associated with the data field, wherein the resolution strategy for the data type specifies one or more mechanisms for merging two edits to resolve conflicts;
  merging, based on the selected resolution strategy, the third value associated with the received edit and the first value associated with the current version to generate a resolved edit that incorporates at least a portion of the first value and a portion of the third value, wherein the merging comprises:
   merging the received edit and a second edit to the earlier version of the record to generate an intermediary resolved edit, merging the intermediary resolved edit the resolved edit to generate a final resolved edit;
  storing the final resolved edit in an operation log in association with a new version of the record to maintain data concurrency of the delta chain for the record; and
  modifying the delta chain to identify the new version of the record to as the most recent version of the record.

* * * * *

UNITED STATES PATENT AND TRADEMARK OFFICE
CERTIFICATE OF CORRECTION

PATENT NO. : 10,198,468 B2
APPLICATION NO. : 15/092603
DATED : February 5, 2019
INVENTOR(S) : Dhananjay Prasanna et al.

Page 1 of 1

It is certified that error appears in the above-identified patent and that said Letters Patent is hereby corrected as shown below:

In the Claims

Column 16, Line 5, Claim 1: "to as" to read as —as—

Column 16, Line 67, Claim 8: "to as" to read as —as—

Column 18, Line 34, Claim 15: "to as" to read as —as—

Signed and Sealed this
Seventh Day of January, 2020

Andrei Iancu
*Director of the United States Patent and Trademark Office*